April 5, 1960     A. MIKOLA, JR     2,931,896
LAMP AND HOUSING ASSEMBLY
Filed Sept. 2, 1958     2 Sheets-Sheet 1
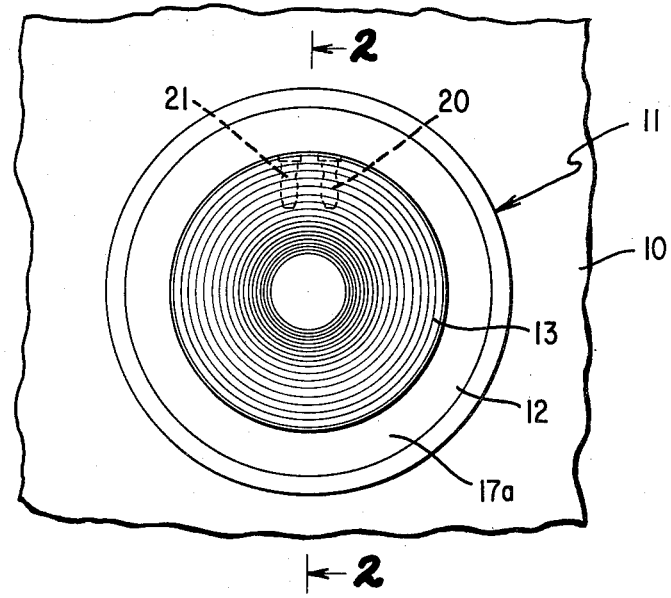
Fig. 1
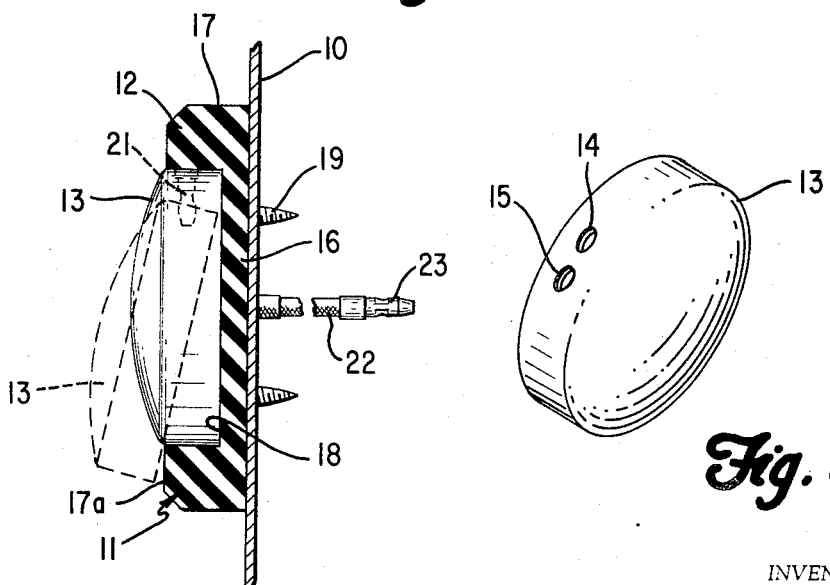
Fig. 2
Fig. 3
INVENTOR.
ANDREW MIKOLA JR.
BY
Malcolm W. Fraser
ATTORNEY April 5, 1960

A. MIKOLA, JR 2,931,896

LAMP AND HOUSING ASSEMBLY

Filed Sept. 2, 1958

INVENTOR.
ANDREW MIKOLA JR.
BY
Malcolm W. Fraser
ATTORNEY

United States Patent Office 2,931,896
Patented Apr. 5, 1960

2,931,896

LAMP AND HOUSING ASSEMBLY

Andrew Mikola, Jr., Swanton, Ohio

Application September 2, 1958, Serial No. 758,233

2 Claims. (Cl. 240—52.1)

This invention relates to lamp assemlies but particularly to those especially adapted for use on motor vehicles, such as trucks, or the like which are mounted in such manner as to be exposed to rain and snow and subjected to jars and shocks normal to the use of such vehicles.

An object is to produce a new and improved lamp assembly employing a sealed beam unit and having a housing of rubber or rubber-like material in which the sealed beam unit fits snugly, the assembly having the novel feature of construction, arrangement and assembly hereinafter described.

Other objects and advantages of the invention will hereinafter appear and for purposes of illustration but not of limitation, an embodiment of the invention is shown on the accompanying drawings in which—

Figure 1 is a top plan view of a lamp assembly mounted on a supporting panel shown in fragment;

Figure 2 is a transverse sectional view on the line 2—2 of Figure 1;

Figure 3 is a perspective view of the sealed beam unit;

Figure 4:
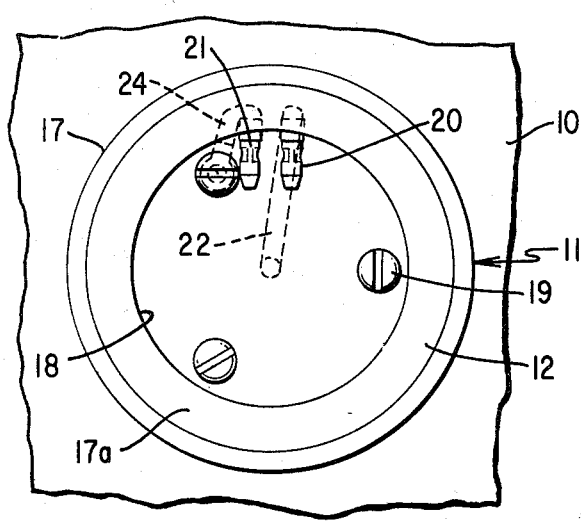
Figure 4 is a top plan view of the housing with the sealed beam unit removed.
Figure 5:
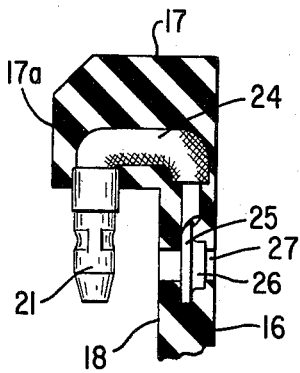
Figure 5 is an enlarged fragmentary sectional view of the housing showing the construction and mounting of one of the terminals.
Figure 6:
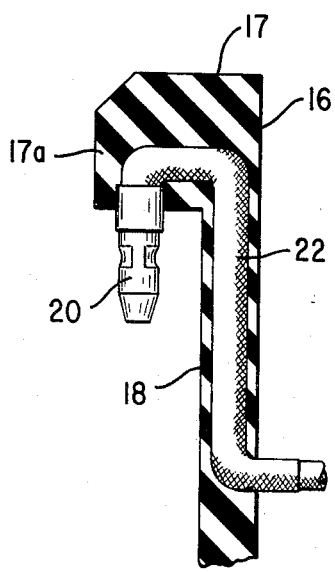
Figure 6 is an enlarged fragmentary sectional view of the housing showing the construction and mounting of the other terminal.
Figure 7:
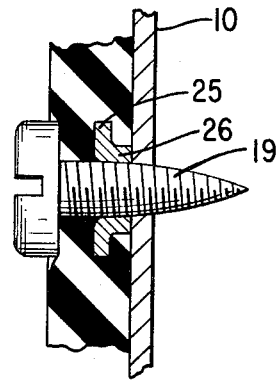
Figure 7 is an enlarged fragmentary sectional view showing the means by which one of the terminals is grounded.

The illustrated embodiment of the invention comprises a sheet metal supporting panel 10 which may be a body panel of a motor vehicle, such as a truck, and mounted on this panel is a lamp and housing assembly 11. The housing is of one-piece molded resilient rubber or rubber-like material and the lamp consists of a sealed beam unit 13 which in this instance is cylindrical in form with a convex top and a flat bottom. This unit includes a reflector and bulb and may be of a translucent or transparent plastic material. The details of construction of the sealed beam lamp unit 13 form no part of the present invention and suffice it to say that the unit is formed in its cylindrical side walls with a pair of spaced holes 14 and 15 for reception of the electrical terminals or connectors as will be hereinafter described, these terminals or connectors extending into these holes and making contact with the terminals (not shown) on the inside of the unit for supplying electrical current thereto for illuminating he lamp.

The housing 12 comprises a flat base 16 and cylindrical side walls 17 and a top wall 17a. In the top wall 17a is a central cylindrical cavity 18 of such size that the sealed beam lamp unit 13 can snugly fit therein, the engagement between the side walls of the lamp unit and the side walls of the cavity being tight and intimate so as to militate against the entrance of rain and also to hold the lamp unit cushioned against shocks and jars incident to the travel of the motor vehicle.

Extending through holes formed in the flat bottom of the lamp cavity 18 are attaching screws 19, there being three in this instance arranged in equidistantly spaced relation and extending through in threaded engagement with the supporting panel 10 for securing the assembly in place.

Carried by the housing and extending radially into the lamp receiving cavity 18 is a pair of electrical terminals 20 and 21, each being of electrical conductive material and having a tapered nose in order to extend into the holes 14 and 15 in the sealed beam lamp unit 13. Thus it will be apparent that a portion of each of the terminals 20 and 21 is embedded or molded into the housing but the greater portion thereof extends radially outward from the housing and into the lamp receiving cavity and in planes substantially parallel to the flat bottom wall of the cavity 18. Suitably secured to the terminal piece 20 is an insulated lead 22 which is molded in the rubber housing extending downwardly and thence inwardly to the central portion of the cavity and then extends substantially at right angles outwardly of the housing. The lead 22 passes through a suitable hole provided in the supporting panel 10 and extends to the storage battery or other source of electrical current. At the outer end of the insulated lead 22 is a similar connector 23 as shown in Figure 2 to connect to the storage battery or the like source of current.

An insulated lead 24 is molded in the housing and is connected to the rear end of the terminal connector 21, extends downwardly and thence at right angles to a sheet metal terminus 25 of electrical conductive material which is aligned with a transverse hole through the bottom wall of the cavity 18 through which one of the screws 19 passes. Surrounding the hole in the sheet metal terminus element 25 is an extruded collar-like portion 26 which receives the respective screw 19. Thus when the screw 19 is tightened, the end of the extruded sleeve or collar 26 may be forced into engagement with the metallic panel 10 and thus provide a ground for the lamp. Manifestly the screw itself engaging the terminal piece 25 may provide the satisfactory ground. However the establishment of a satisfactory ground is insured either through the screw 19, the extruded sleeve 26 or both.

From the above description it will be manifest the sealed beam 13 is mounted in position by first slightly bending the terminals 20 and 21 upwardly so that they may be forced into the holes 14 and 15 and then the unit 13 forced snugly into the socket 18. The resilience of the rubber cooperates in making this possible. In view of the snug fit between the sealed beam unit 13 and the housing 12, the entrance of rain or moisture is substantially prevented. Since the housing 12 is of rubber or rubber-like material, a satisfactory resilience is afforded to enable the mounting of the lamp unit in position of use in a snug manner and in such a way that the walls of the lamp unit are intimately engaged by the housing, thereby holding it from damage due to jars and shocks. Due to the intimate engagement between the unit 13 and the housing, the liability of water, dust and dirt entering and interfering with the life and operation of the unit is prevented. The unique manner in which the unit is grounded is of importance in order to insure that a satisfactory ground will be secured. By molding the leads within the housing, the liability of their becoming damaged is virtually prevented.

Numerous changes in details of construction, arrangement and choice of materials may be effected without departing from the spirit of the invention, especially as defined in the appended claims.

What I claim is:

1. A lamp assembly for motor vehicles or the like, comprising a housing of resilient rubber-like material having a cavity, a sealed beam unit snugly fitting said cavity and retained in place by the resilience of the material, said unit having contact terminal receiving holes in the side thereof, terminal members partly contained in the housing for detachable connection to said unit, said terminal members having their inner ends embedded in the housing and projecting into said cavity to project into said holes upon canting the members upwardly to enable the beam unit to be forced into place with the terminal members and thence into the socket, and leads extending respectively from said terminal members.

2. A lamp assembly for motor vehicles or the like, comprising a housing of resilient rubber-like material having a cavity, a sealed beam unit snugly fitting said cavity and retained in place by the resilience of the material, said unit having contact terminal receiving holes in the side thereof, terminal members partly contained in the housing for detachable connection to said unit, said terminal members having their inner ends embedded in the housing and projecting into said cavity to project into said holes upon canting the members upwardly to enable the beam unit to be forced into place with the terminal members and thence into the socket, leads for each terminal member molded in the housing, one lead extending from the underside of the housing, a sheet metal piece on the other lead to establish a ground, the bottom of the cavity having screw receiving holes for mounting the assembly, said sheet metal piece being molded in the housing and having an aperture registering with one of said holes whereby engagement between a screw and the sheet metal piece provides a ground, and an extrusion around said last hole which may be forced by the screw into contact with a supporting panel.

References Cited in the file of this patent

UNITED STATES PATENTS

| | | |
|---|---|---|
| 2,099,444 | Langdon | Nov 16, 1937 |
| 2,202,315 | Langdon | May 28, 1940 |
| 2,225,981 | Casson | Dec. 24, 1940 |
| 2,757,275 | Lehr | July 31, 1956 |
| 2,809,283 | Spencer | Oct. 8, 1957 |
| 2,860,233 | Johnson | Nov. 11, 1958 |